United States Patent Office 3,035,948
Patented May 22, 1962

---

3,035,948
GELLED NITROALKANE PROPELLANTS
Homer M. Fox, Bartlesville, Okla., assignor to Phillips Petroleum Company, a corporation of Delaware
No Drawing. Filed Apr. 29, 1959, Ser. No. 809,874
19 Claims. (Cl. 149—19)

This application relates to gel propellants. In one aspect this invention relates to solid or semi-solid gel propellants prepared by adding a gelling agent to a liquid nitroalkane or mixtures of liquid nitroalkanes.

One of the advantages for use of solid propellants over liquid propellants is that fuel injectors, leak proof tanks, pumps, pipes or tubes, meters, and complicated controls are not required. Such items contribute to the dead weight of a rocket motor or missile and are the source of operational difficulties. Solid propellants of the composite type comprising one or more solid oxidizers uniformly dispersed in a rubbery binder have met with widespread application. In the preparation of composite type propellants it has not been generally feasible to utilize a major amount of any one liquid component unless the liquid could be incorporated in the other solid components present. For example, minor amounts of liquid plasticizers have been used with rubbery polymers, and thermosetting or curable liquid polymers have been used in the preparation of binders with solid oxidizers. Thus, many potentially valuable liquid propellant ingredients cannot be readily employed as the major ingredient of a composite type propellant, or used in a manner analogous to solid propellants.

We have discovered it is possible to produce a homogenerous semi-solid or solid gel from liquid nitroalkanes by contacting said alkanes with a solid rubbery polymer, defined further hereinafter. Since in the resulting gel mixture the nitroalkane is an oxidizer, the gelled mixture can be referred to as an oxidizer gel and it is sometimes desirable to include or incorporate in the gelled mixture a fuel component capable of being oxidized by said oxidizer, i.e., said nitroalkane. Other propellant additives or modifiers, defined hereinafter, can also be incorporated in the gel mixture if desired.

Thus, broadly speaking, the present invention resides in a mixture comprising a rubbery polymer (defined further hereinafter), and at least one nitroalkane.

An object of this invention is to provide a solid or semi-solid gel propellant prepared by adding a gelling agent to a liquid nitroalkane or mixtures of liquid nitroalkanes. Another object of this invention is to use a rubbery material or polymer as a gelling agent for nitroalkanes. Another object of this invention is to provide a propellant gel produced from high energy liquid fuels and oxidizers. Still another object of this invention is to provide a propellant gel produced from high energy liquid fuels which can be used in a manner analogous to solid propellants. Other aspects, objects, and advantages of the invention will be apparent to those skilled in the art in view of this disclosure.

Thus, according to the invention there is provided a composition of matter comprising a mixture of, in weight percent: from about 10 to about 90 percent of a rubbery polymer selected from the group consisting of natural rubber, polyurethanes, polybutadiene, polychloroprene, copolymers of a conjugated diene with a heterocyclic nitrogen base, and copolymers of a conjugated diene with styrene; and from 90 to 10 percent of a nitroalkane selected from the group consisting of normally liquid nitroalkanes containing from 1 to 4 carbon atoms per molecule and having an average of at least one nitro group per atom of carbon, and liquid mixtures of nitroalkanes containing from 1 to 4 carbon atoms per molecule where in the mixture there is an average of at least one nitro group per atom of carbon.

The nitroalkanes useful in the practice of the invention are those containing from 1 to 4, inclusive, carbon atoms per molecule and having an average of at least one nitro group per carbon atom. Mixtures of said nitro-alkanes can also be used. When nitroalkanes are used which have an average of less than one nitro group per atom of carbon, such nitroalkanes are used in conjunction with other nitroalkanes so as to give a mixture averaging at least one nitro group per carbon atom. Said nitroalkanes, when normally liquid, can be used alone or in mixtures with other normally liquid nitroalkanes. When said nitroalkanes are solids they can be used in admixture with a normally liquid alkane to give a liquid mixture. The term "normally liquid," as used herein and in the claims, means liquid at 20–25° C. and atmospheric pressure. Examples of nitroalkanes useful in the practice of the invention include, among others, the following: nitromethane; nitroethane; dinitromethane; trinitromethane; tetranitromethane; 1,2-dinitroethane; 1,1-dinitroethane; 1,1,2-trinitroethane; hexanitroethane; 1-nitropropane; 2-nitropropane; 2,2-dinitropropane; 1,3-dinitropropane; 1,1,1-trinitropropane; octanitropropane; 1,4-dinitrobutane; 1,2,4-trinitrobutane; 1,2,3,4-tetranitrobutane; 1,1,2,2,3,3,4,4-octanitrobutane; and decanitrobutane. The preferred nitroalkanes are those having from one to two carbon atoms per molecule. The most preferred nitrokanes are tetranitromethane, and liquid mixtures comprising a major amount of tetranitromethane in admixture with one or more other nitroalkanes; said mixtures averaging one or more nitro groups per carbon atom, as described above.

Suitable solid rubbery materials or polymers which can be used in the practice of the invention include, among others: natural rubber; polyurethanes; polybutadiene; polychloroprene; copolymers of a conjugated diene with a heterocyclic nitrogen base; and copolymers of a conjugated diene with styrene. Said rubbery materials can vary in consistency from very soft rubbers, i.e., materials which are soft at room temperature but will show retraction when relaxed, to those having a Mooney valve (ML–4) up to 100 or higher. The materials most frequently preferred have Mooney values 10 and 40.

Any suitable polyurethane can be used in the practice of the invention. Presently preferred polyurethanes are those prepared by the interaction of a polyisocyanate with an active hydrogen-containing compound selected from the group consisting of aliphatic saturated and unsaturated polyhydroxy compounds and polyamino compounds containing at least one active hydrogen atom. Said polyurethane monomers are usually reacted in substantially stoichiometric amounts. However, said active hydrogen-containing compound can be used in amounts up to 15 weight percent in excess of stoichiometric and said diisocyanate can be used in amounts up to 25 weight percent in excess of stoichiometric.

While organic polyisocyanates in general can be used in the practice of this invention, the diisocynates are preferred because of their availability and ease of preparation. Said polyisocyanates should be liquid under the conditions of use defined above. Representative polyisocyanates include, among others, the following: benzene-1,3-diisocyanate, benzene-1,4-diisocyanate, hexamethylene diisocyanate, toluene-2,4-diisocyanate; toluene-2,5-diisocyanate, diphenylmethane-4,4'-diisocyanate, diphenyl-4,4'-diisocyanate, diphenyl-3,3'-dimethyl-4,4'-diisocyanate, 2-chloropropane-1,3-diisocyanate, diphenyl-3,3'-dimethoxy-4,4'-diisocyanate, naphthalene-1,5-diisocyanate, pentamethylene diisocyanate, tetramethylenediisocyanate, octamethylene diisocyanate, dimethylene diisocyanate, propylene-1,2-diisocyanate, benzene-1,2,4-triisocyanate, toluene-2,3-diisocyanate, diphenyl-2,2'-diisocyanate, naphthalene-2,7-diisocyanate, naphthalene-1,8-diisocyanate, toluene-2,4,6-triisocyanate, benzene-1,3,5-triisocyanate, benzene-1,2,3-triisocyanate, and toluene-2,3,4-triisocyanate.

Active hydrogen-containing compounds which can be used are those which are known to react with polyisocyanates to form polyurethane. Compounds which are useful for this purpose in the practice of the invention are those which contain hydroxyl and/or amino groups, each of said amino groups containing at least one active hydrogen atom, and which are reactive with an isocyanate group, —NCO. Compounds employed have two or more of said reactive hydrogen-containing groups in the molecule. Commonly, the preferred compounds are glycols and hydroxy containing esters, including polyglycols and polyesters. Polyamino compounds including diamines such as putrescine and cadaverine can also be employed. Triols such as glycerol and tetrols such as erythritol can also be used. Natural products which are particularly useful include castor oil, which comprises a glyceride of ricinoleic acid, and ricinoleyl alcohol, and mixtures thereof. Said active hydrogen containing compounds should be liquid under the conditions of use.

Other examples of these active hydrogen containing compounds include alkylene glycols such as ethylene glycol, diethylene glycol, tetraethylene glycol, neopentyl glycol, compounds designated as polyethylene glycol and polypropylene glycol having a molecular weight as high as 10,000 and even higher, propylene glycol, dipropylene glycol, mixed glycols such as the ethylene-propylene glycols, butylene glycol, dibutylene glycol, pentamethylene glycol, ricinoleyl alcohol, pentaerythritol [2,2-bis(hydroxymethyl)-1,3-propanediol], esters containing two or more OH groups, and the like. The esters can be made by reaction of dicarboxylic acids with glycols. Acids which can be used in the preparation of these esters include adipic, sebacic, succinic, phthalic and ricinoleic. These acids can be reacted with the above-described glycols to give esters of relatively low (e.g., 200–500) to relatively high (10,000 and even higher) molecular weight. Various methods for the preparation of these esters are known. For example, the acid and glycol can be reacted at an acid to glycol mol ratio between 0.5 and 2 under conditions to promote elimination of the water produced by the reaction. Still another method involves alternate additions of dicarboxylic acid and of glycol.

Still other examples of the active hydrogen containing compounds are ethanolamine, diethanolamine, isopropanolamine, diisopropanolamine, ethanolisopropanolamine, dibutanolamine, ethanolbutanolamine, ethylenediamine, diethylenetriamine, triethylenetetramine, tetraethylenepentamine, propylenediamine, dipropylenetriamine, hexamethylenediamine, heptamethylenediamine, 2,3-dimethyl-1,6-diaminohexane, 4,6-diethyl-1,5,8-triaminooctane, 3,9-dimethyl-4,8-diisobutyl-1,6,11-triaminoundecane, 1,5-diamine-2-pentene, 1,6-dimethyl-1,7-diamino-4-heptene, and 2,8,7-trimethyl-1,6,10-triamino-3-decene.

The copolymers of a conjugated diene with a heterocyclic nitrogen base can be prepared by various methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion as the unreacted vinylpyridine monomer is difficult to remove by stripping.

The conjugated dienes employed are those containing from 4 to 10 carbon atoms per molecule and include 1,3-butadiene, isoprene, 2-methyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl, 1,3-hexadiene, 2-cyano-1,3-butadiene, are also applicable.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one,

substituent wherein R' is either hydrogen or a methyl group. That is, the substituent is either a vinyl or an alphamethylvinyl (isopropenyl) group. Of these, the compounds of the pyridine series are of the greatest interest commercially at present. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

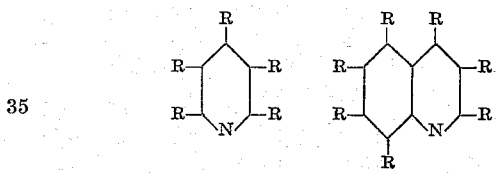

or

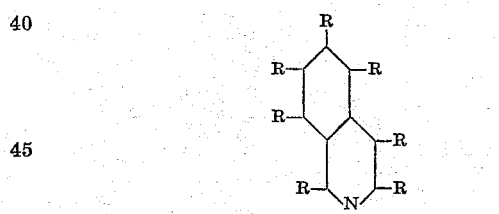

where R is selected from the group consisting of hydrogen, alkyl, vinyl, alphamethylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alphamethylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methyl-phenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propylquinoline; 2-methyl-4-nonyl-6-vinylpyridine; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline-3-vinyl-5,6-dichloroisoquinoline; 2-vinyl-6-ethoxy-7-methylquinoline; 3-vinyl-6-hydroxymethylisoquinoline; and the like.

One example of a copolymer of a conjugated diene with styrene is a copolymer of 1,3-butadiene with styrene. Such copolymers are commonly known in the art as GR–S rubbers. Said GR–S rubbers can be prepared by any of the well known methods employing well known recipes. Any of the well known GR–S rubbers containing from 1 to 2 and up to about 25 parts of styrene can be used in the practice of the invention. The GR–S rubber designated as 1505 is one preferred copolymer for use in the practice of the invention. GR–S 1505 can be prepared by copolymerizing 1,3-butadiene with styrene at 41° F. using a sugar free, iron activated, rosin-acid emulsified system. A charge weight ratio of butadiene to styrene is 90/10 and the polymerization is allowed to go to approximately 52 percent completion. The copolymer is then salt acid coagulated and usually has a mean raw Mooney value (ML–4) of about 40. Said copolymers usually have a bound styrene content of about 8 weight percent. Further details regarding the preparation of GR–S rubbers can be found in Industrial and Engineering Chemistry, 40, pages 769–777 (1948) and United States Patents 2,583,277, 2,595,892, 2,609,362, 2,614,100, 2,647,109, and 2,665,269.

Polychloroprene is a synthetic rubber-like material made from 2-chloro-1,3-butadiene (chloroprene) by emulsion polymerization using potassium persulfate as an initiator and to maintain the polymerization. Said polymerization is usually carried out at about 40° C. After the desired degree of conversion has been obtained the polymerization is stopped by adding tetraethylthiuram disulfide. After aging, the alkaline latex is acidified with acetic acid and the polymer recovered therefrom. Further details regarding the preparation of polychloroprene can be found in Kirk-Othmer, "Encyclopedia of Chemical Technology," 11, pp. 854–856.

Polyvinyl chloride can be prepared by either suspension polymerization or emulsion polymerization, both methods being well known to those skilled in the art. In suspension polymerization water is used as a medium with a suspension agent such as polyvinyl alcohol and an oil soluble catalyst such as benzoyl peroxide. One typical recipe has been reported as: 100 parts of vinyl chloride; 0.1–0.2 part of benzoyl peroxide; 200 parts of water; and 0.05–0.1 part polyvinyl alcohol. Further details regarding the preparation of polyvinyl chloride can be found in Kirk-Othmer, "Encyclopedia of Chemical Technology," 14, pp. 726–728.

Various methods for the production of polybutadiene are well known to those skilled in the art. Most commonly, said polybutadiene is prepared by mass polymerization at temperatures ranging from 20 to 60° C. and in the presence of an alkali metal catalyst such as sodium. Further details regarding the preparation of rubbery polybutadiene can be found in U.S. Patents 2,483,886; 2,483,-887; and 2,506,857; and in Whitby, "Synthetic Rubber," John Wiley and Sons, New York, 737–747 and 959–961 (1954).

The above-described propellant composition comprising a rubbery polymer as defined above, and at least one nitroalkane as defined above to give a gelled mixture comprises the base propellant of the invention. Thus, herein and in the claims, unless otherwise specified, the term "base propellant" refers to said mixture.

Said base propellant is useful and finds many applications as a rocket propellant and as a charge for gas generator devices. However, it is sometimes desirable to incorporate in said base propellant a fuel component capable of being oxidized by the nitroalkane, and/or one or more propellant additives to alter the performance of said base propellant and enhance its performance in specific applications. For example, high energy additives such as finely divided boron, and finely divided metals are sometimes incorporated in said base propellant to increase the specific impulse thereof. Other examples of propellant additives which can be incorporated in said base propellants are: inorganic and/or organic oxidizing salts as supplemental oxidizers; burning rate catalysts or modifiers to alter or control the burning rate of said propellants; and oxides of nitrogen to lower the freezing point of the nitroalkanes. Said fuel component and each of said propellant additives are usually used in amounts ranging from 0 to 25 parts by weight per 100 parts by weight of said base propellant.

The fuel component in the propellant compositions of the invention can be any fuel material capable of being oxidized by the oxidizing mixture of the rubbery polymer and nitroalkane. Thus, the invention is not limited to any specific fuel as the fuel component of the propellant composition. The invention resides in a gelled nitroalkane, gelled with a rubbery polymer.

Examples of fuel components preferred in the practice of the invention include elemental carbon in various forms such as carbon black, graphite, and the like; liquid and solid organic compounds, such as the saturated aliphatic hydrocarbons; organic polymers; organic ketones, such as the alkyl ketones and the aryl alkyl ketones, and the like; alkyl ethers of saturated glycols; and polyalkylene glycols.

Examples of said hydrocarbon fuels which can be used in the practice of the invention include, among others, the following: the normally liquid and normally solid hydrocarbons containing at least five carbon atoms per molecule such as normal pentane, cyclohexane and other cyclic paraffins, octanes, dodecanes, hexadecanes, eicosanes, paraffin wax, liquid polymers of ethylene, solid polymers of ethylene, liquid copolymers of ethylene and propylene, solid copolymers of ethylene and propylene, liquid polymers of propylene, solid polymers of propylene, and the like. Hydrocarbons containing less than five carbon atoms per molecule which are not normally liquid at ordinary temperatures can also be used in the practice of the invention when they are present in solution in said normally liquid or normally solid hydrocarbons. For example, propane and butane can be present in mixtures of normally liquid hydrocarbons such as those boiling in the gasoline boiling range or kerosene boiling range, etc.

Examples of said organic ketones which can be used in the practice of the invention include, among others, the following: diethyl ketone; ethyl butyl ketone; methyl isobutyl ketone; dihexyl ketone; hexyl methyl ketone; methyl phenyl ketone (acetophenone); cyclohexanone; and the like. Said ketones also serve to modify the gel properties and in some cases to lower the vapor pressure. Acetophenone is a presently preferred ketone.

Examples of alkyl ethers of saturated glycols which can be used in the practice of the invention include, among others, the following: monomethyl ether of ethylene glycol; monoethyl ether of ethylene glycol; and monopropyl ether of ethylene glycol. Examples of polyalkylene glycols include those formed by condensation of ethylene glycol; those formed by condensation of propylene glycol; and those formed by condensation of mixtures of ethylene and propylene glycol; and the like.

Said high energy additives are employed as finely divided powders having a particle size less than about 200 microns. Examples of said high energy additives which can be employed in the practice of the invention include, among others, the following: boron, lithium, beryllium, magnesium, aluminum, calcium, and the like. Powdered hydrides of said high energy additives such as decaborane, beryllium hydride, lithium hydride, lithium-aluminum hydride, aluminum hydride, and the like can also be used in the practice of the invention. Alloys of said metals such as aluminum with magnesium, aluminum with copper, and magnesium with zinc can also be used in the practice of the invention. Powdered carbides of said metals such as aluminum carbide and boron tetracarbide can also be used in the practice of the invention to give useful results. Said powdered high energy additives are frequently employed in conjunction with and as a supplement to an organic fuel component, particularly a liquid organic fuel component such as the ketones. In some instances mixtures of said high energy additives with nitroalkanes are unstable. In such instances the high energy additive can be encapsulated in a suitable material such as paraffin wax, resins, polyethylene and the like which are inert to the nitroalkanes. The encapsulating material stabilizes the propellant composition for storage purposes but enables the composition to burn smoothly in use because under combustion conditions said encapsulating material is removed progressively as combustion proceeds. Any suitable encapsulation or coating technique can be employed. It has been observed that said powdered high energy additives also serve to stiffen the gels.

Solid inorganic oxidizers which are applicable in the propellant compositions of the invention include ammonium perchlorate, the alkali metal perchlorates, ammonium nitrate, and the alkali metal nitrates. As used herein, the term "alkali metal" includes sodium, potassium, lithium, casium, and rubidium. Ammonium nitrate and ammonium perchlorate are the presently preferred solid inorganic oxidizers. Mixtures of said inorganic oxidizers are also applicable. When ammonium nitrate is used as the solid inorganic oxidizer, it is frequently preferred to use a phase stabilized ammonium nitrate. One method of phase stabilizing ammonium nitrate comprises mixing about 10 parts by weight of a potassium salt (usually potassium nitrate) with about 90 parts by weight of ammonium nitrate along with some water, heating the mixture to about 140–150° F., drying, and then grinding the mixture to the desired particle size. In the preparation of the propellant compositions of the invention said solid inorganic oxidizers are usually ground to a particle size preferably within the range between 20 and 200 microns average particle size. The most preferred particle size is from about 40 to about 60 microns.

Solid organic oxidizers can also be incorporated in the propellant compositions of the invention. Said organic oxidizers are employed as finely divided powders, preferably of the same particle size range as said inorganic oxidizers. The use of said finely divided oxidizers not only serves to reinforce the gel, but also permits the use of more polymer gelling agent and/or more of said organic fuel component. Examples of solid organic oxidizers which can be used in the practice of the invention include, among others, guanidine nitrate, nitroguanidine, cyanoguanidine, pentaerythritol tetranitrate, cyclotrimethylene trinitramine, and solid nitroalkanes containing not more than four carbon atoms.

Any suitable burning rate catalyst or modifier can be used in the propellant compositions of the invention. It is preferred that said burning rate catalyst or modifier be as finely divided as possible, preferably having a particle size of less than 20 microns. Examples of said burning rate catalysts or modifiers applicable in the practice of the invention include, among others, the following: ammonium dichromate; iron oxide; copper chromite; Milori blue; and the like. Metal ferrocyanides and ferricyanides can also be used. Ferric ferrocyanides, such as Prussian, Berlin, Hamburg, Chinese, Paris, and Milori blue (mentioned above), soluble ferric ferrocyanides, such as soluble Berlin or Prussian blue which contains potassium ferric ferrocyanides and ferric ferrocyanides which have been treated with ammonia, are among the materials which can also be used. Ferrous ferricyanide (Turnbull's blue) is also applicable. Milori blue, mentioned above, is a pigment similar to Prussian blue but having a red tint and is prepared by the oxidation of a paste of potassium ferrocyanide and ferrous sulfate. Other metal compounds such as nickel and copper ferrocyanides can also be employed.

Thus, a general formulation for the propellant compositions of the invention is as follows.

| Base propellant: | Weight percent |
|---|---|
| Polymer | 10–90 |
| Nitroalkane | 90–10 |

| Propellant additives | Parts/100 parts of base propellant |
|---|---|
| Fuel component | 0–25 |
| High energy additive | 0–25 |
| Inorganic oxidizer | 0–25 |
| Organic oxidizer | 0–25 |
| Burning rate catalyst or modifier | 0–25 |
| Nitrogen oxides | 0–25 |

In the practice of the invention gelation of the nitroalkanes is produced by contacting the rubbery polymer with the nitroalkanes. Gel formation is accelerated by suitable mixing of the materials in any suitable manner, preferably in a non-shear type of mixer, for example an overhead rotary such as a Ross mixer. Other types of mixers such as a Waring Blendor, ultrasonic mixers, plunger type mixers which force the materials to be mixed through an orifice, etc. can also be used. The fuel component can be incorporated by mixing with the polymer or with the nitroalkanes prior to contacting of said polymer with nitroalkanes. To incorporate propellant modifiers or additives, such as the types mentioned hereinabove, said modifiers or additives can, if desired, be dispersed in the gelled mixture of polymer and nitroalkanes, or they can be mixed with the polymer, with the nitroalkanes, or part with the polymer and part with the nitroalkanes, prior to gelation.

In contacting the rubbery polymer with the nitroalkane it is preferred, but not essential, that said rubbery polymer be finely divided for convenience in mixing and processing. Gel formation is more rapid when said polymer is finely divided. Particle sizes of 1–200 microns are preferred although larger particle sizes can be utilized.

The following examples will serve to further illustrate the invention.

Example I

A polyurethane was prepared using the following materials in the amounts shown.

| | Parts by weight |
|---|---|
| Flexricine-15(beta hydroxy ethyl ricinoleate) | 3.7 |
| Castor oil | 3.8 |
| Toluene diisocyanate | 2.5 |

The above materials were mixed together by stirring vigorously for five minutes. Vacuum was then applied to the mixing vessel to remove bubbles from the reaction mixture and said reaction mixture was then cured at 160° F. for four days.

The resulting polyurethane was cut into small pieces and separate weighed portions thereof were placed in separate small glass cups. Each cup was then filled brim full with tetranitromethane to give a 75:25 weight ratio of tetranitromethane to polyurethane. The cups were maintained in a sealed bottle at ambient temperature (about 25° C.) for 15 days, during which time said cups were maintained brim full by adding, from time to time, a small amount of tetranitromethane to replace that which was lost by evaporation. By the end of 15 days a firm, uniform gel had been obtained.

The several portions of the thus prepared propellant composition in the glass cups were each burned in a bomb at room temperature (20–25° C.) and under different nitrogen pressures covering the range from 300 to 1200 p.s.i.g. Burning of the sample was initiated by means of an igniter wire. Burning was indicated by an optical system comprising a lead sulfide cell in one arm of a Wheatstone bridge. As the propellant burned, the rays emitted passed through a quartz window in the bomb and onto said lead sulfide cell. A recording was made of the infrared intensity registered by said lead sulfide cell as a function of time. This recording clearly indicated the duration of the burning and was used to compute the burning rate. Graphs of the burning rate, $r$, versus pressure were prepared and a smooth curve drawn to represent the results and to obtain the burning rate at 1000 p.s.i.g. These results, together with the pressure exponent, $n$, of the burning rate equation, $r=ap_c^n$, are given in the tabulation below:

$r$ at 600 p.s.i.g., in./sec. _____ 0.846
$n$ at 600 p.s.i.g. _____ 0.94

The propellant composition burned smoothly in the glass cup and left little or no residue.

*Example II*

A measure of the sensitivity to impact of the gelled propellant of Example I was obtained by placing a portion of said propellant in a cup shaped depression in a steel plate so as to form a sample having a diameter of 0.25 inch and a thickness of 0.05 inch, and then dropping a four pound steel ball onto a Stellite plunger placed on top of the propellant in said depression. The height in inches from which the ball could be dropped without detonation of the propellant is a measure of the sensitivity to impact. The composition tested had an impact sensitivity greater than five. The exact value above five was not determined.

As indicated herein, the present invention relates to propellant compositions wherein liquid propellant ingredients are used in major proportions in said compositions. Said liquid ingredients are gelled or otherwise converted to a viscous mass. However, such gelled compositions may, under some pressure differential conditions, flow so that by themselves they cannot always be employed per se in the manner of solid propellants. In such instances, or when otherwise desirable, the gelled compositions can be confined or restricted in any suitable manner. For example, in some instances the combustion chamber of the rocket motor can be adapted so that the walls of said chamber serve to confine the gelled composition. In other instances the gelled composition can be confined by restricting or coating all surfaces thereof, except the surface where it is desired that burning take place, with any suitable restricting material which is adhesive to and has a slower burning rate than said composition. Examples of suitable restrictor materials are certain synthetic rubbers such as copolymers of butadiene with 2-ethyl-5-vinylpyridine, ethylcellulose, cellulose acetate, etc. In other instances the gelled composition can be confined in any suitable confining container as described in Example I above.

As used herein and in the claims, unless otherwise specified, the terms "gel propellant," "gelled propellant," "propellant gel," or "oxidizer gel" refer to a composition prepared by mixing together (1) a liquid oxidizer, such as one of the above-defined nitroalkanes, and (2) a rubbery polymer as defined above, to form a gel; it being understood that said gel can, if desired, have at least one of the above-defined fuel components and/or propellant additives or modifiers incorporated therein. The gel propellants of the invention are semi-solid or solid organogel systems which exhibit flow only upon the influence of a finite force.

As will be apparent to those skilled in the art, various other modifications of the invention can be made or followed in view of the above disclosure, without departing from the spirit and scope of said invention.

I claim:

1. A composition of matter consisting essentially of a mixture of, in weight percent: from about 10 to about 90 percent of a rubbery polymer selected from the group consisting of natural rubber, polyurethanes, polybutadiene, polychloroprene, copolymers of a conjugated diene with a heterocyclic nitrogen base, and copolymers of a conjugated diene with styrene; and from 90 to 10 percent of a nitroalkane selected from the group consisting of normally liquid nitroalkanes containing from 1 to 4 carbon atoms per molecule and having an average of at least one nitro group per atom of carbon, and liquid mixtures of nitroalkanes containing from 1 to 4 carbon atoms per molecule where in the mixture there is an average of at least one nitro group per atom of carbon.

2. A composition of matter according to claim 1 wherein said nitroalkane is tetranitromethane.

3. A propellant composition comprising the mixture of claim 1 as a base propellant and containing up to 25 parts by weight per 100 parts by weight of said base propellant of a finely divided solid organic oxidizer selected from the group consisting of nitroguanidine, guanidine nitrate, pentaerythritol tetranitrate, cyanoguanidine, cyclotrimethylene trinitramine, and solid nitroalkanes containing not more than 4 carbon atoms.

4. A propellant composition comprising the mixture of claim 1 as a base propellant and containing up to 25 parts by weight per 100 parts by weight of said base propellant of a finely divided solid inorganic oxidizing salt selected from the group consisting of the ammonium and alkali metal salts of perchloric acid and nitric acid, and mixtures of said salts.

5. A propellant composition comprising the mixture of claim 1 as a base propellant and containing up to 25 parts by weight per 100 parts by weight of said base propellant of a finely divided high energy additive selected from the group consisting of boron, beryllium, magnesium, aluminum, calcium, alloys of said metals, and carbides of said metals.

6. A propellant composition comprising the mixture of claim 1 as a base propellant and a fuel component selected from the group consisting of normally liquid and normally solid saturated aliphatic hydrocarbons, polyethylene, polypropylene, and copolymers of ethylene and propylene; said fuel component being present in an amount up to 25 parts by weight per 100 parts by weight of said base propellant.

7. A propellant composition according to claim 6 containing, in addition, up to 25 parts by weight per 100 parts by weight of said base propellant of a finely divided high energy additive selected from the group consisting of boron, beryllium, magnesium, aluminum, calcium, alloys of said metals, and carbides of said metals.

8. A propellant composition comprising the mixture of claim 1 as a base propellant and a fuel component selected from the group consisting of diethyl ketone, ethyl butyl ketone, methyl isobutyl ketone, dihexyl ketone, hexyl methyl ketone, acetophenone, cyclohexanone; said fuel component being present in an amount up to 25 parts by weight per 100 parts by weight of said base propellant.

9. A propellant composition according to claim 8 containing, in addition, up to 25 parts by weight per 100 parts by weight of said base propellant of a finely divided high energy additive selected from the group consisting of boron, beryllium, magnesium, aluminum, calcium, alloys of said metals, and carbides of said metals.

10. A propellant composition comprising the mixture of claim 1 as a base propellant and a fuel component selected from the group consisting of lower alkyl ethers of saturated glycols, polyalkylene glycol formed by condensation of ethylene glycol, polyalkylene glycol formed by condensation of propylene glycol, and polyalkylene glycol formed by condensation of mixtures of ethylene and propylene glycols; said fuel component being present in an amount up to 25 parts by weight per 100 parts by weight of said base propellant.

11. A propellant composition according to claim 10 containing, in addition, up to 25 parts by weight per 100 parts by weight of said base propellant of a finely divided high energy additive selected from the group consisting of boron, beryllium, magnesium, aluminum, calcium, alloys of said metals, and carbides of said metals.

12. A propellant composition according to claim 5 wherein: said nitroalkane is tetranitromethane; and said high energy additive is powdered aluminum.

13. A propellant composition according to claim 4 wherein: said nitroalkane is tetranitromethane; and said solid inorganic oxidizing salt is ammonium perchlorate.

14. A propellant composition comprising the mixture of claim 1 as a base propellant wherein: said nitroalkane is tetranitromethane; and containing, in addition, up to 25 parts by weight per 100 parts by weight of said base propellant of a suitable burning rate catalyst.

15. A propellant composition according to claim 14 wherein: said burning rate catalyst is Milori blue.

16. A propellant composition according to claim 14 wherein: said burning rate catalyst is copper chromite.

17. A composition of matter consisting essentially of a mixture of, in weight percent: from about 10 to about 90 percent of a rubbery polymer selected from the group consisting of (a) natural rubber, (b) a polyurethane formed by the interaction of a polyisocyanate and an active hydrogen containing compound selected from the group consisting of aliphathic saturated and unsaturated polyhydroxy compounds and polyamino compounds containing at least one active hydrogen atom, (c) polybutadiene, (d) polychloroprene, (e) copolymers of a conjugated diene containing from 4 to 10 carbon atoms per molecule with a

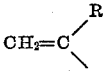

substituted heterocyclic nitrogen base selected from the group consisting of pyridine, quinoline, alkyl substituted pyridine, and alkyl substituted quinoline wherein the total number of carbon atoms in the nuclear alkyl substituents is not more than 15 and wherein R is selected from the group consisting of hydrogen and a methyl radical, and (f) copolymers of a conjugated diene containing from 4 to 10 carbon atoms per molecule with styrene; and from 90 to 10 percent of a nitroalkane selected from the group consisting of normally liquid nitroalkanes containing from 1 to 4 carbon atoms per molecule and having an average of at least one nitro group per atoms of carbon, and liquid mixtures of nitroalkanes containing from 1 to 4 carbon atoms per molecule where in the mixture there is an average of at least one nitro group per atom of carbon.

18. A propellant composition according to claim 17 wherein said rubbery polymer is a polyurethane formed by the interaction of a polyisocyanate and an active hydrogen containing compound selected from the group consisting of aliphatic saturated and unsaturated polyhydroxy compounds and polyamino compounds containing at least one active hydrogen atom.

19. A propellant composition according to claim 18 wherein said polyurethane is formed by the interaction of toluene diisocyanate, castor oil, and beta hydroxy ethyl ricinolate.

References Cited in the file of this patent
UNITED STATES PATENTS

| | | |
|---|---|---|
| 2,530,493 | Van Loenen | Nov. 21, 1950 |
| 2,690,964 | Maisner | Oct. 5, 1954 |

FOREIGN PATENTS

| | | |
|---|---|---|
| 582,621 | Great Britain | Nov. 22, 1946 |